United States Patent [19]

Hergenrother et al.

[11] Patent Number: 5,145,937

[45] Date of Patent: Sep. 8, 1992

[54] POLYIMIDES WITH CARBONYL AND ETHER CONNECTING GROUPS BETWEEN THE AROMATIC RINGS

[75] Inventors: Paul M. Hergenrother, Yorktown; Stephen J. Havens, Newport News, both of Va.

[73] Assignee: The United States of America as represented by the Administrator of the National Aeronautics and Space Administration, Washington, D.C.

[21] Appl. No.: 433,812

[22] Filed: Nov. 9, 1989

[51] Int. Cl.$^5$ .................. C08G 8/02; C08G 14/00; C08G 69/26
[52] U.S. Cl. .................. 528/125; 528/128; 528/172; 528/185; 528/229; 528/352; 528/353; 428/473.5; 556/418; 564/315; 564/328; 564/428; 564/440; 564/442; 564/443; 564/502; 562/15
[58] Field of Search ............ 528/125, 128, 353, 172, 528/185, 352, 229; 428/473.5; 564/315, 328, 428, 440, 442, 443, 502; 556/418; 562/15

[56] References Cited

U.S. PATENT DOCUMENTS

| | | | |
|---|---|---|---|
| 3,502,762 | 3/1970 | Haller | 264/204 |
| 4,316,844 | 2/1982 | Waitkus | 528/125 |
| 4,820,791 | 4/1989 | Hergenrother et al. | 528/353 |

OTHER PUBLICATIONS

Hergenrother et al., "Polyimides" Denver Amer. Chem. Symposium Apr. 1987.

*Primary Examiner*—John Kight, III
*Assistant Examiner*—P. Hampton-Hightower
*Attorney, Agent, or Firm*—George F. Helfrich

[57] ABSTRACT

New polyimides have been prepared from the reaction of aromatic dianhydrides with novel aromatic diamines containing carbonyl and ether connecting groups between the aromatic rings. Several of these polyimides were shown to be semi-crystalline as evidenced by wide angle x-ray diffraction and differential scanning calorimetry. Most of the polyimides form tough solvent resistant films with high tensile properties. Several of these materials can be thermally processed to form solvent and base resistant moldings.

5 Claims, No Drawings

POLYIMIDES WITH CARBONYL AND ETHER CONNECTING GROUPS BETWEEN THE AROMATIC RINGS

ORIGIN OF THE INVENTION

The invention described herein was jointly made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates to new polyimides formed from the reaction of aromatic dianhydrides with novel diamines containing carbonyl and ether connecting groups between the aromatic rings whereby processable, high strength, solvent, chemical and impact-resistant polyimides are obtained.

2. Description of the Related Art

Polyimides are condensation polymers commonly synthesized by the reaction of aromatic dianhydrides with aromatic diamines. The intermediate polyamide acid is either thermally or chemically cyclodehydrated to form the polyimide which has a repeat unit of the general type

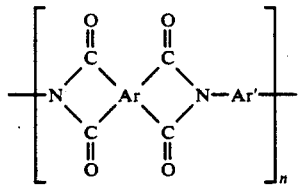

Ar is a tetravalent aromatic radical which can be as simple as 1,2,4,5-tetrasubstituted benzene. Ar may be a 4-bis-(o-diphenylene) having the general structure

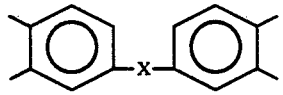

where X=nil, O, S, $SO_2$, C=O, and $Si(CH_3)_2$, or Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene, or any other appropriate divalent radical.

Synthesis and characterization of polyimides has been extensively reported in literature. The preparation of aromatic polyimides by reaction of an aromatic dianhydride with an aromatic diamine, followed by thermal cyclization was first reported in 1963 [G. M. Bower and L. W. Frost, *J. of Polym. Sci.* A1, 3135 (1963)]. Several reviews on polymers have been published [C. E. Sroog, "Polyimides" in *Encyclopedia of Polymer Science and Technology* (H. F. Mark, N. G. Gaylord, and N. M. Bikales, Ed.), Interscience Publishers, New York, 1969, Vol. 11, pp. 247-272; N. A. Adrova, M. I. Bessonov, L. A. Laius, and A. P. Rudakov, *Polyimides*, Technomic Publishing Co., Inc., Stamford, Conn., 1970; M. I. Bessnov, M. M. Koton, V. V. Kudryavtsev, and L. A. Laius, *Polyimides: Thermally Stable Polymers*, Consultants Bureau, New York, 1987.]

Wholly aromatic polyimides are known for their exceptional thermooxidative and chemical resistance. Several polyimides such as Kapton® (DuPont), PI-2080 (formerly Upjohn, now Dow), XU-218 (Ciba-Geigy), ULTEM ® (General Electric) and LARC-TPI (Mitsui Toatsu) are commercially available and used as films, moldings, adhesives, and composite matrices. As a class of materials, aromatic linear polyimides are generally considered to be amorphous. However, there are numerous examples of polyimides which display crystallinity [Adrova, op. cit., pp. 136-144; T. L. St. Clair and A. K. St. Clair, *Journal of Polymer Science, Polymer Chemistry Edition*, 15, 1529 (1977)]. Kapton®, polyimide film has been shown to exhibit molecular aggregation or superstructure [S. Isoda, H. Shioda, M. Kochi and H. Kambe, *Journal of Polymer Science, Polymer Physics Edition*, 19, 1293 (1981); S. Isoda, M. Kochi, and H. Kambe, Ibid., 20, 837 (1982)]. Kapton ® and other reported semi-crystalline polyimides exhibit exceptional thermal stability and resistance to solvents while under stress, but cannot be easily thermoformed into useful molded objects or composites.

The introduction of crystallinity into a polymer has long been recognized as an effective means of improving the solvent resistance and increasing the modulus. In addition, if the proper degree and type of crystallinity is attained, the material can also display extremely high toughness. A notable example is polyetheretherketone (PEEK ® of Imperial Chemical Industries) which exhibits a very high fracture toughness ($G_{Ic}$, critical strain energy release rate), and is highly solvent resistant. PEEK ® can also be thermally processed into moldings and composites. The carbonyl and ether connecting groups between the aromatic rings in PEEK ® tend to be so stereochemically similar that the tendency toward crystalline order is greatly enhanced [T. E. Atwood, P. C. Dawson, J. L. Freeman, L. R. J. Hoy, J. B. Rose and P. A. Staniland, *Polymer*, 22, 2096 (1981)].

It would be advantageous if the benefits of PEEK ® could be obtained from polyimides. Polyimides are more easily prepared and isolated than PEEK ®. Additionally, special technology is required for impregnating PEEK ® into fibers due to the insolubility of PEEK ® in common solvents. The polyamide acid precursor to polyimides is usually soluble and is applied as a solution to fibers or fabric. In this manner good impregnation or "wetting" of the fibers is obtained before thermal cyclodehydration to form an insoluble polyimide. An alternate method involving melt impregnation with the polyimide such as in powder form is also envisioned.

The ratio of carbonyl to ether linkages is critical toward achieving the goal of thermally processable semi-crystalline polyimides. The carbonyl and ether linkages could be incorporated into either the Ar (dianhydride) or the Ar' (diamine) portion of the polyimide repeat unit. However, experience has shown that the diamine portion is easier to modify, resulting in fewer steps than required for the synthesis of new dianhydrides. Novel diamines containing varying ratios of carbonyl to ether groups can be readily synthesized from commercially available materials.

U.S. Pat. No. 4,820,791, Hergenrother, et al, discloses a similar method of making polyimides using aromatic dianhydrides and aromatic diamines with carbonyl and ether groups between the aromatic rings. However, the present invention produces novel polyimides and novel diamines. These new polyimides are not obvious because the improvements over the previous polyimide preparation could not be predicted by the placement of —(CH$_2$)$_z$— or —(CF$_2$)$_z$— in the center of the diamines or the addition of isopropyl groups to the diamines. The use of —(CH$_2$)$_z$— gave a much shorter annealing time, and the use of the —(CF$_2$)$_z$— and the isopropyl groups improved the solubility of the materials. Similarly it was not apparent that replacing the carbonyl groups in the diamines with phosphine oxide would be an improvement over the old polyimide by producing a more flame resistant polyimide.

SUMMARY OF THE INVENTION

The present invention is a new composition of matter and concerns new polyimides and novel monomers and the process for preparing them.

One object of the present invention is to provide new polyimides that are useful as adhesives, coatings, films, membranes, and composite matrices.

Another object of the present invention is the synthesis of five new monomers which are useful in the preparation of these novel polyimides:

1,3-bis(4-aminophenylisopropylidene-3'-phenoxy-4"-benzoyl)benzene;
1,4-bis(4-aminophenylisopropylidene-4'-phenoxy-4"-benzoyl)benzene;
bis(4-aminophenoxy-4'-phenyl)phenyl phosphine oxide;
1,4-bis(4-aminophenoxy-4'-benzoyl)butane; and
1,6-bis(4-aminophenoxy-4'-benzoyl)hexane.

According to the present invention, the foregoing and additional objects are attained by synthesizing polyimides from the reaction of aromatic dianhydrides with the five new diamines, which contain carbonyl and ether connecting groups between the aromatic rings. Several of these polyimides were shown to be semicrystalline as evidenced by wide angle x-ray diffraction and differential scanning calorimetry. Glass transition temperatures ranged between 172° and 258° C., and crystalline melt temperatures were observed between 332° and 338° C. Solution cast films of several of the polyimides were tough and flexible. Tensile strengths, tensile moduli, and elongations at break ranged between 14,400 to 14,600 psi, 391,000 to 453,000 psi, and 6.1 to 23.4%, respectively at 25° C. Mechanical properties at 177° C. were also good. The polyimide from the reaction of 3,3',4,4'-benzophenonetetracarboxylic dianhydride and 1,6-bis(4-aminophenoxy-4'-benzoyl)hexane provided a solvent resistant semicrystalline material which could be molded at 380° C. In addition, the degree of crystallinity of this polyimide could be readily altered by either quenching from a temperature above its crystalline melt temperature (332° C.), or annealing at a temperature above its glass transition temperature but below its crystalline melt temperature.

DESCRIPTION OF THE PREFERRED EMBODIMENTS

The general reaction sequence for the synthesis of the novel diamines is represented by the following equations:

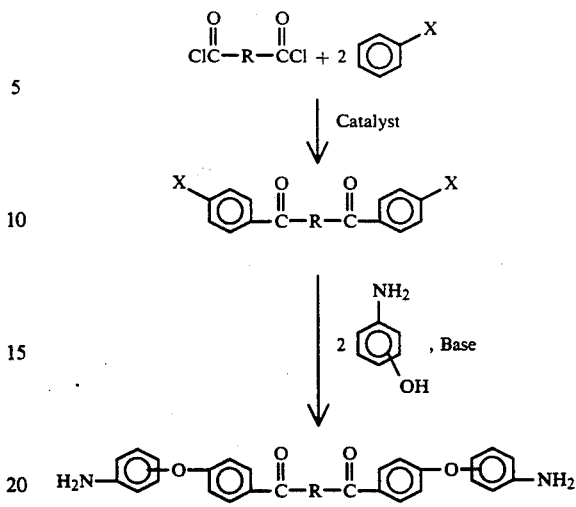

wherein R is selected from a group of aromatic radicals consisting of:

—(CH$_2$)$_Z$, —(CF$_2$)$_Z$, 

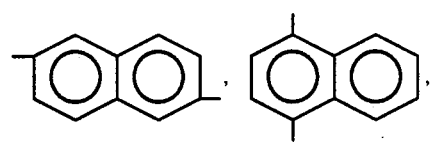

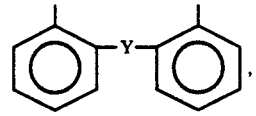

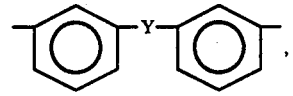

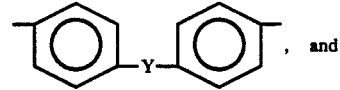, and

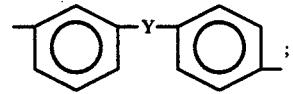;

wherein Y is not a substituent or is a substituent selected from the group consisting of:

O,S,C=O,SO$_2$,CH$_2$,C(CH$_3$)$_2$,C(CF$_3$)$_2$, and Si(CH$_3$)$_2$;

wherein Z is an integer between 1 and 10.

X is either a fluorine or chlorine atom. The catalyst is a Lewis Acid which is preferably AlCl$_3$, but may be AlBr$_3$, FeCl$_3$, SnCl$_4$, BCl$_3$, BF$_3$, and the like.

The base is an alkali metal hydroxide or carbonate selected from NaOH, KOH, Na₂CO₃, K₂CO₃ and the like.

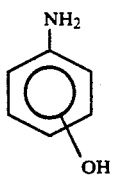

represents either 3-aminophenol or 4-aminophenol.

Other aminophenols can also be used such as

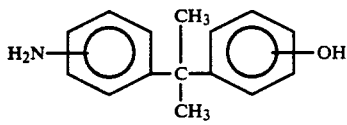

where the NH₂ and OH groups may be in the 3 or 4 position.

Additionally, several of the diamines have been prepared by reduction of the corresponding dinitro compound:

This was accomplished using either catalytic hydrogenation with an appropriate catalyst or a sulfide such as sodium sulfide.

Therefore Ar' is equivalent to either

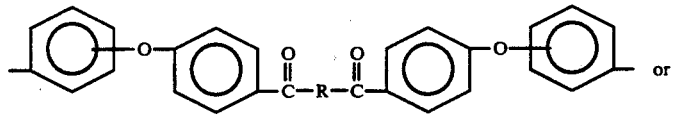 or

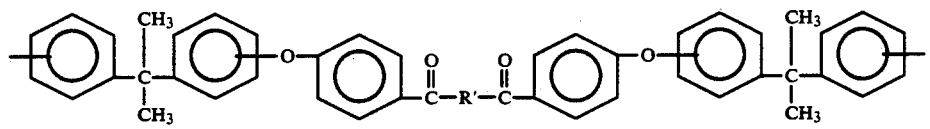

in the following general equation for the synthesis of new polyimides:

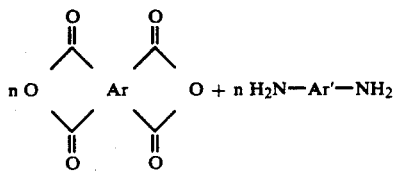

↓ Solvent

-continued

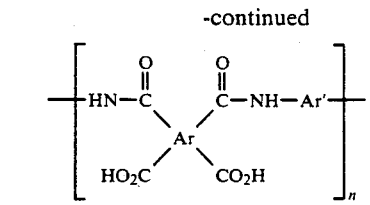

Cyclodehydration ↓ −2nH₂O

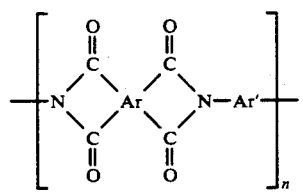

wherein n is an integer from 4–100. The solvent is preferably N,N-dimethylacetamide, but may be other solvents such as N,N-dimethylformamide, dimethyl sulfoxide, N-methylpyrrolidinone, m-cresol, or ether solvents such as diglyme.

Cyclodehydration is accomplished chemically or by heating the intermediate polyamide acid at temperatures exceeding 150° C. Ar is selected from a group of radicals consisting of

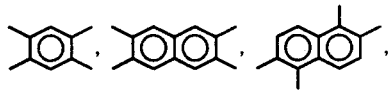

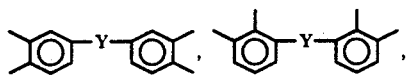

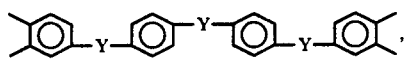

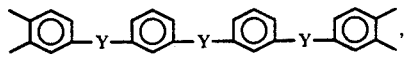

-continued

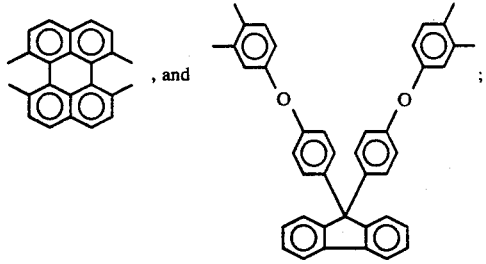, and wherein Y is not a substituent or is a substituent selected from the group consisting of:

O, S, C=O, SO$_2$, CH$_2$, C(CH$_3$)$_2$, C(CF$_3$)$_2$, and Si(CH$_3$)$_2$.

The following examples illustrate the reaction sequence of several of the polyimides. The invention is not limited to these examples.

EXAMPLE 1

Monomer Synthesis (a) 1,4-Bis(4-fluorobenzoyl)benzene:

Anhydrous aluminum chloride (80.0 g, 0.60 mol) was added to a stirred solution of terephthaloyl chloride (50.8 g, 0.25 mol) dissolved in fluorobenzene (235 ml, 2.5 mol) over a 10–15 minute period. The mixture was stirred at room temperature for one hour and then maintained at 70°–80° C. for four hours. After cooling, the reaction mixture was poured onto approximately 1000 g of ice containing 100 ml of concentrated hydrochloric acid. The resulting suspension was separated by decantation and washed several times with water. The organic layer was distilled to remove excess fluorobenzene and the solid residue collected by filtration, washed with water, and dried at 100° C. The crude solid was recrystallized from approximately 2000 ml of toluene to afford 70.7 g (88% yield) of 1,4-bis(4-fluorobenzoyl)-benzene; mp 218.5°–219.5° C.; Anal. Calcd for C$_{20}$H$_{12}$F$_2$O$_2$: C, 74.53%; H, 3.75%; F, 11.179%. Found: C, 74.60%; H, 3.80%; F, 11.83%.

(B) 1,4-Bis(4-aminophenylisopropylidene-4'-phenoxy-4"-benzoyl benzene 2-(4-hydroxyphenyl)-2-(4'-aminophenyl)propane (13.64 g, 0.060 mol) and 1,4-bis(4-fluorobenzoyl)benzene (9.67 g, 0.030 mol) were added to a solution of N,N-dimethylacetamide (45 ml) and toluene (50 ml) in a three-neck flask equipped with a Dean-Stark trap. Powdered anhydrous potassium carbonate (10.37 g, 0.075 mol) was added and water was removed by azeotropic distillation with toluene. Toluene was removed until the temperature reached 130°–140° C. The reaction mixture was stirred at 130°–140° C. overnight under a nitrogen atmosphere. The mixture was allowed to cool and subsequently added to water to precipitate a solid which was collected by filtration and dried. Recrystallization from 1:1 toluene-ethanol afforded 1,4-bis(4-aminophenylisopropylidene-4'-phenoxy-4"-benzoyl)benzene (18.3 g, 83% yield) as a yellow solid; mp 129°–131° C.; 'H NMR (CDCl$_3$) δ1.66 (s, 12H, CH$_3$) 3.58 (s, 4H, NH$_2$), 6.3–8.2 (m, 28H, aromatic). Anal. Calcd for C$_{32}$H$_{24}$N$_2$O$_4$: C, 81.50%; H, 6.02%; N, 3.80%. Found: C, 81.34%; H, 5.58%; N, 3.50%.

Polyimide Synthesis 3,3',4,4'-Benzophenonetetracarboxylic dianhydride (1.9334 g, 0.0060 mol) was added in small portions over a period of one-half to one hour to a mechanically stirred solution of 1,4-bis(4-aminophenylisopropylidene-4'-phenoxy-4"-benzoyl)benzene (4.4215 g, 0.0060 mol) dissolved in N,N-dimethylacetamide (38.8 ml), which was maintained under a nitrogen atmosphere at room temperature. The polyamide acid solution (15% solids w/w) was stirred overnight and the inherent viscosity at 0.5% concentration in N,N-dimethylacetamide was subsequently determined to be 0.65 dl/g at 25° C. The polyamide acid solution was centrifuged, the decantate cast onto plate glass using a doctor blade, and dried to a tack-free form in a dust-free chamber. The film on glass was then thermally converted to the polyimide by heating in air at 100°, 200°, and 300° C. for one hour at each temperature. The resulting yellow polyimide film (approximately 2.0 mils thick) was determined by differential scanning calorimetry to have a glass transition temperature at 222° C. The film as cured on glass was determined by wide angle x-ray diffraction to be amorphous. Tensile strength, tensile modulus, and elongation at break of this film were determined to be 14,400 psi, 391,000 psi, and 23.4% at 25° C.; and, 7000 psi, 241,000 psi, and 40.6% at 177° C., respectively. Specimens of this film placed under stress were unaffected after 72 hours immersion in solvents which included JP-4 (jet fuel), ethylene glycol (deicing fluid), and tricresyl phosphate (hydraulic fluid component).

EXAMPLE 2

Monomer Synthesis

Bis-(4-aminophenoxy-4'-phenyl)phenyl phosphine oxide

4-Aminophenol (10.9 g, 0.10 mol) and bis(4-fluorophenyl)phenyl phosphine oxide (15.7 g, 0.05 mol) (used as obtained from Hoechst Celanese) were added to a solution of N,N-dimethylacetamide (100 ml) and toluene (30 ml) in a three-neck flask equipped with a Dean-Stark trap. Powdered anhydrous potassium carbonate (15.2 g, 0.11 mol) was added and water was removed by azeotropic distillation with toluene. Toluene was removed until the temperature reached 130°–140° C. The reaction mixture was stirred at 130°–140° C. overnight under a nitrogen atmosphere. The mixture was allowed to cool and subsequently added to water to precipitate a solid which was collected by filtration and dried. Recrystallization from toluene-ethanol afforded bis(4-aminophenoxy-4'-phenyl)phenyl phosphine oxide (19.2 g, 78% yield); mp 98°–102° C.; 'H NMR (CDCl$_3$) δ3.54 (s, rH, NH$_2$), 6.3–8.0 (m, 21H, aromatic). Anal. Calcd for C$_{30}$H$_{25}$N$_2$PO$_3$: C, 73.16%; H, 5.12%; N, 5.69%; P, 6.29%. Found: C, 73.71%; H, 5.59%; N, 5.49; P, 5.98%.

Polyimide Synthesis 3,3',4,4'-Benzophenonetetracarboxylic dianhydride (1.6112 g, 0.005 mol) was added all at once to a mechanically stirred solution of bis(4-aminophenoxy-4'-phenyl)phenyl phosphine oxide (2.4625 g, 0.005 mol) dissolved in N,N-dimethylacetamide (16 ml), which was maintained under a nitrogen atmosphere at room temperature. The polyamide acid solution (15% solids w/w) was stirred overnight and the inherent viscosity at 0.5% concentration in N,N-dimethylacetamide was subsequently determined to be 0.64 dl/g at 25° C. The polyamide acid solution was centrifuged, the decantate cast onto plate glass using a doctor blade, and dried to a tack-free form in a dust-free chamber. The film on glass was then thermally converted to the polyimide by heating in air at 100°, 200°, and 300° C. for one hour at each temperature. The resulting yellow polyimide film (approximately 2.0 mils thick) was determined by differential scanning calorimetry to have a glass transition temperature at 258° C. The film as cured on glass was determined by wide angle x-ray diffraction to be amorphous. Tensile strength, tensile modulus, and elongation at break of this film were determined to be 14,600 psi, 453,000 psi, and 6.1% at 25° C.; and, 7600 psi, 253,000 psi, and 3.1% at 177° C., respectively.

EXAMPLE 3

Monomer Synthesis (A) 1,4-Bis(4-fluorobenzoyl)butane

Adipoyl chloride (45.8 g, 0.25 mol) was added over a 30-45 minute period to a mechanically stirred suspension of aluminum chloride (83.3 g, 0.625 mol) in fluorobenzene (235 ml, 2.5 mol) maintained at 5°-10° C. The yellow slurry was allowed to warm to room temperature and was stirred overnight. The reaction mixture was poured onto approximately 1000 g of ice containing 100 ml of concentrated hydrochloric acid. The resulting suspension was separated by decantation and washed several times with water. The organic layer was distilled to remove excess fluorobenzene and the solid residue collected by filtration, washed with water, and dried at 110° C. The crude solid was recrystallized from approximately 1000 ml of toluene to afford 57.0 g (76% yield) of 1,4-bis(4-fluorobenzoyl) butane; mp 165°-167° C.; $^1$H NMR (CDCl$_3$) δ1.2-2.1 (m, 4H, C$\underline{H}_2$), 3.00 (t, 4H, O=CC$\underline{H}_2$, J=7.0 Hz), 7.0-8.2 (m, 8H, aromatic). Anal. Calcd. for C$_{18}$H$_{16}$F$_2$O$_2$: C, 71.51%; H, 5.33%; F, 12.57%. Found: C, 71.68%; H, 5.38%; F, 12.78%.

(B) 1,4-Bis(4-aminophenoxy-4'-benzoyl)butane

4-Aminophenol (4.37 g, 0.040 mol) and 1,4-bis(4-fluorobenzoyl)butane (6.05 g, 0.020 mol) were added to a solution of N,N-dimethylacetamide (40 ml) and toluene (50 ml) in a three-neck flask equipped with a Dean-Stark trap. Powdered anhydrous potassium carbonate (6.91 g, 0.050 mol) was added and water was removed by azeotropic distillation with toluene. Toluene was removed until the temperature reached 130°-140° C. The reaction mixture was allowed to cool and subsequently added to water to precipitate a solid which was collected by filtration and dried. Recrystallization from toluene, followed by recrystallization from 1:1 N,N-dimethylformamide-ethanol afforded 1,4-bis(4-aminophenoxy-4'-benzoyl)butane (2.36 g, 25% yield) as a yellow solid; mp 199°-201° C.; $^1$H NMR (DMF-d$_7$) δ1.5-2.0 (m, 4H, C$\underline{H}_2$), 2.98 (t, 4H, O=CC$\underline{H}_2$, J=7.0 Hz), 4.90 (s, 4H, N$\underline{H}_2$), 6.5-8.2 (m, 16H, aromatic). Anal. Calcd. for C$_{30}$H$_{24}$N$_2$O$_4$: C, 74.98%; H, 5.87%; N, 5.83%. Found: C, 74.29%; H, 5.59%; N, 5.98%.

Polyimide Synthesis 3,3',4,4'-Benzophenonetetracarboxylic dianhydride (1.1277 g, 0.0035 mol) was added in small portions over a period of 20-30 minutes to a mechanically stirred solution of 1,4-bis(4-aminophenoxy-4'-benzoyl)butane (1.6820 g, 0.0035 mol) dissolved in N,N-dimethylacetamide (16.4 ml), which was maintained under a nitrogen atmosphere at room temperature. The polyamide acid solution (15% solids, w/w) was stirred overnight and the inherent viscosity at 0.5% concentration in N,N-dimethylacetamide subsequently determined to be 1.14 dl/g at 25° C. The polyamide acid solution was centrifuged, the decantate cast onto plate glass using a doctor blade, and dried to a tack-free form in a dust-free chamber. The film on glass was then thermally coverted to the polyimide by heating in air at 100°, 200°, and 300° C. for one hour at each temperature. The resulting yellow polyimide film (approximately 2.0 mils thick) was determined by differential scanning calorimetry to have a glass transition temperature at 204° C., a weak crystalline melt transition at 278° C., and a strong crystalline melt transition at 338° C. The film as cured on glass was brittle and determined by wide angle x-ray diffraction to be semi-crystalline.

EXAMPLE 4

Monomer Synthesis (A) 1,6-Bis(4-fluorbenzoyl)hexane

Suberoyl chloride (40.8 g, 0.1933 mol) was added over a 30-45 minute period to a mechanically stirred suspension of aluminum chloride (64.4 g, 0.483 mol) in fluorobenzene (181 ml, 1.93 mol) maintained at 5°-10° C. The yellow slurry was allowed to warm to room temperature and was stirred overnight. The reaction mixture was poured onto approximately 1000 g of ice containing 75 ml of concentrated hydrochloric acid. The resulting suspension was separated by decantation and washed several times with water. The organic layer was distilled to remove excess fluorobenzene and the solid residue collected by filtration, washed with water, and dried at 100° C. The crude solid was recrystallized from approximately 500 ml of toluene to afford 43.0 g (67% yield) of 1,6-bis(4-fluorobenzoyl)hexane; mp 123°-124° C.; $^1$H NMR (CDCl$_3$) δ1.0-2.1 (m, 8H, C$\underline{H}_2$), 2.97 (t, 4H, O=CC$\underline{H}_2$, J=7.0 Hz), 6.9-8.3 (m, 8H, aromatic). Anal. Calcd. for C$_{20}$H$_{20}$F$_2$O$_2$: C, 72.71%; H, 6.10%; F, 11.50%. Found: C, 72.50%; H, 5.86%; F, 11.19%.

(B) 1,6-Bis(4-aminophenoxy-4'-benzoyl)hexane

4-Aminophenol (10.91 g, 0.100 mol) and 1,6-bis(4-fluorobenzoyl)-hexane (16.52 g, 0.050 mol) were added to a solution of N,N-dimethylacetamide (125 ml) and toluene (50 ml) in a three-neck flask equipped with a Dean-Stark trap. Powdered anhydrous potassium carbonate (17.3 g, 0.125 mol) was added and water was removed by azeotropic distillation with toluene. Toluene was removed until the temperature reached 130°-140° C. The reaction mixture was stirred at 130°-140° C. overnight under a nitrogen atmosphere. The mixture was allowed to cool and subsequently added to water to precipitate a solid which was collected by filtration and dried. Recrystallization from approximately 500 ml of toluene afforded 1,6-bis(4-aminophenoxy-4'-benzoyl)hexane (19.9 g, 78% yield) as a yellow solid; mp 145°-146.5° C.; $^1$H NMR (DMF-d$_7$) δ 1.1-2.0 (m, 8H, C$\underline{H}_2$) 3.00 (t, 4H, O=CC$\underline{H}_2$, J=7.0 Hz) 5.14 (s, 4H, N$\underline{H}_2$), 6.6-8.3 (m, 16H, aromatic).

Polyimide Synthesis 3,3',4,4'-Benzophenonetetracarboxylic dianhydride (1.6112 g, 0.0050 mol) was added in small portions over a period of 20-30 minutes to a mechanically stirred solution of 1,6-bis(4-aminophenoxy-4'-benzoyl)hexane (2.5431 g, 0.0050 mol) dissolved in N,N-dimethylacetamide (25.1 ml), which was maintained under a nitrogen atmosphere at room temperature. The polyamide acid solution (15% solids, w/w) was stirred overnight and the inherent viscosity at 0.5% concentration in N,N-dimethylacetamide subsequently determined to be 0.86 dl/g at 25° C. The polyamide acid solution was centrifuged, the decantate cast onto plate glass using a doctor blade, and dried to a tack-free form in a dust-free chamber. The film on glass was then thermally converted to the polyimide by heating in air at 100°, 200°, and 300° C. for one hour at each temperature. The resulting yellow polyimide film (approximately 2.0 mils thick) was determined by differential scanning calorimetry to have a glass transition temperature at 172° C. and a strong crystalline melt transition at 332° C. The film as cured on glass was brittle and determined by wide angle x-ray diffraction to be semi-crystalline. The brittle polyimide film was ground to a powdered form and molded in a 1.25 inch square stainless steel mold at 380° C. under 1000 psi to give a well-consolidated molding. The fracture toughness ($K_{Ic}$) as obtained on miniature compact tension specimens was 395 psi /in. The moldings were not noticeably affected by common aircraft fluids such as JP-4 (jet fuel), ethylene glycol (deicing fluid), tricresyl phosphate (hydraulic fluid component), or methylene chloride (paint stripper component) after 72 hours immersion. In addition the moldings were not noticeably affected by immersion in strong base such as 30% aqueous sodium hydroxide.

Table 1 contains the chemical structures, melting points, and yields of representative difluoro compounds used in the experiments.

Table 2 contains the chemical structures, melting points, and yields of the representative diamines used in the experiments.

The chemical structure, inherent viscosity of the precursor polyamide acid, glass transition temperature, and crystalline melt temperature of representative polyimides containing carbonyl and ether connecting groups are presented in Table 3.

TABLE 1

MELTING POINTS AND YIELDS OF DIFLUORO COMPOUNDS

| DIFLUORO COMPOUNDS | MELTING POINT, °C. | YIELD, % |
|---|---|---|
| F—⟨⟩—C(O)—⟨⟩—C(O)—⟨⟩—F | 177.5–178.5 | 81[A] |
| F—⟨⟩—C(O)—⟨⟩—C(O)—⟨⟩—F | 218.5–219.5 | 88[A] |
| F—⟨⟩—P(O)(⟨⟩)—⟨⟩—F | 124–126 | B |
| F—⟨⟩—C(O)(CH$_2$)$_4$C(O)—⟨⟩—F | 165.5–167.6 | 76[A] |
| F—⟨⟩—C(O)(CH$_2$)$_6$C(O)—⟨⟩—F | 123–124 | 67[A] |

[A]Yields after recrystallization from toluene.
[B]Used as obtained from Hoechst Celanese

TABLE 2

MELTING POINTS AND YIELDS OF DIAMINES

| DIAMINE | MELTING POINT, °C. | YIELD, % |
|---|---|---|
| H$_2$N—⟨⟩—C(CH$_3$)$_2$—⟨⟩—O—⟨⟩—C(O)—⟨⟩—C(O)—⟨⟩—O—⟨⟩—C(CH$_3$)$_2$—⟨⟩—NH$_2$ | 74–80 | 78[B] |
| H$_2$N—⟨⟩—C(CH$_3$)$_2$—⟨⟩—O—⟨⟩—C(O)—⟨⟩—C(O)—⟨⟩—O—⟨⟩—C(CH$_3$)$_2$—⟨⟩—NH$_2$ | 129–131 | 83[C] |
| H$_2$N—⟨⟩—O—⟨⟩—P(O)(⟨⟩)—⟨⟩—O—⟨⟩—NH$_2$ | 98–102 | 83[C] |
| H$_2$N—⟨⟩—O—⟨⟩—C(O)(CH$_2$)$_4$C(O)—⟨⟩—O—⟨⟩—NH$_2$ | 199–201 | 25[D] |
| H$_2$N—⟨⟩—O—⟨⟩—C(O)(CH$_2$)$_6$C(O)—⟨⟩—O—⟨⟩—NH$_2$ | 145–146.5 | 68[A] |

Yields after recrystallization from: A, toluene; B, toluene-methanol; C, toluene-ethanol; D, N,N-dimethylformamide-ethanol.

TABLE 3
POLYIMIDES CONTAINING CARBONYL AND ETHER CONNECTING GROUPS

| Ar' | POLYAMIDE ACID $\eta_{inh}$, dL/g[A] | POLYIMIDE Tg, °C | Tm, °C |
|---|---|---|---|
| | 0.55 | 164 | ND[B] |
| | 0.65 | 222 | ND[B] |
| | 0.64 | 258 | ND[B] |
| | 1.14 | 204 | 338 |
| | 0.86 | 172 | 332 |

[A]Inherent viscosity of 0.5% concentration in N,N-dimethylacetamide at 25° C.
[B]Not detected.

What is new and desired to be secured by Letters Patent of the United States is:

1. A high molecular weight linear polyimide having high strength, modulus, toughness, and solvent resistance, and having the general structural formula:

(a) wherein Ar is a radical selected from the group consisting of:

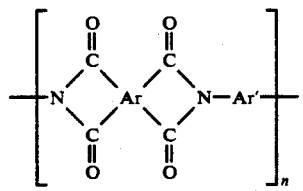

wherein Y is a band or is a substituent selected from the group consisting of:

O, S, C=O, SO$_2$, CH$_2$, C(CH$_3$)$_2$, C(CF$_3$l)$_2$ and Si(CH$_3$)$_2$;

(b) wherein Ar' is a radical selected from a group consisting of:
(1) a radical having the structural formula:

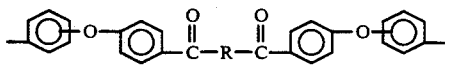

wherein R is a radical selected from the group consisting of:

—(CH$_2$)$_z$— and —(CF$_2$)$_z$—, wherein z is an integer between 1 and 10;
(2) a radical having the structural formula:

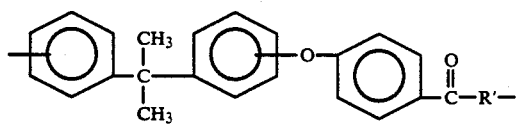

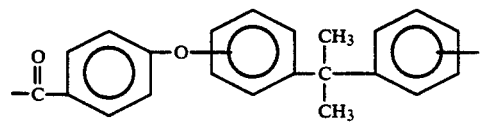

wherein R' is selected from the group consisting of

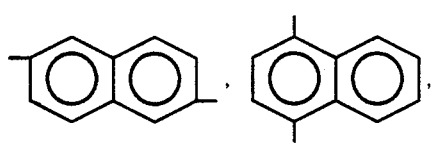

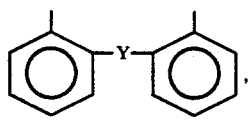

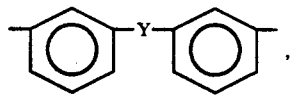

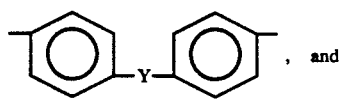, and

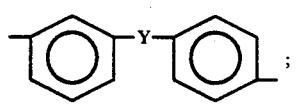;

wherein Y is a bond or is a substituent selected from the group consisting of:

O, S, C=O, SO$_2$, CH$_2$, C(CH$_3$)$_2$, and C(CF$_3$)$_2$;

(3) a radical having the structural formula:

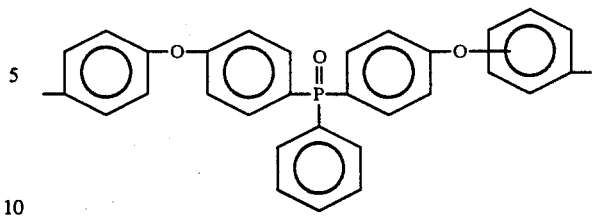

(c) wherein n is an integer between 4 and 100.

2. A diamine having the general structural formula:

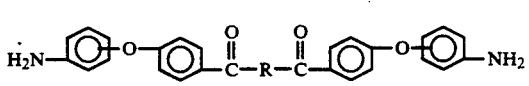

wherein R is a radical selected from the group consisting of:

—(CH$_2$)$_z$— and —(CF$_2$)$_z$—;

wherein z is an integer between 1 and 10.

3. A diamine having the general structural formula:

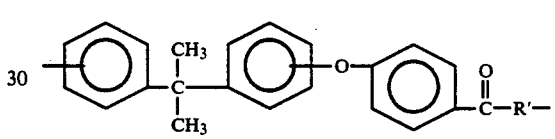

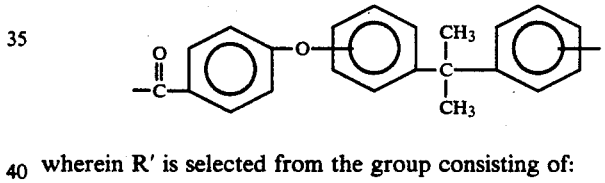

wherein R' is selected from the group consisting of:

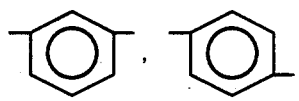

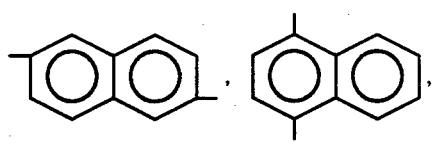

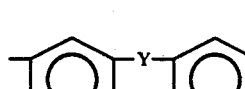

, and

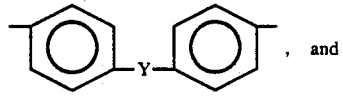

-continued
wherein Y is a bond or is a substituent selected from the group consisting of:
O, S, C=O, SO$_2$, CH$_2$, C(CH$_3$)$_2$, and C(CF$_3$)$_2$.
4. A diamine having the general structural formula:
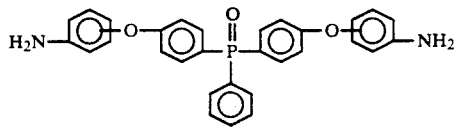
5. A film from a polyimide according to claim 1 which is unaffected by immersion in a strong base for up to 18 hours.
* * * * *